Sept. 3, 1963 W. C. STYPULKOWSKI ET AL 3,102,982

AIR RESCUE TRANSMISSION APPARATUS

Filed March 13, 1961 4 Sheets-Sheet 1

INVENTORS
KENNETH C. JACOBS
WALTER C. STYPULKOWSKI
BY Kane, Dalsimer and Kane
ATTORNEYS

AIR RESCUE TRANSMISSION APPARATUS

Filed March 13, 1961

INVENTORS
KENNETH C. JACOBS
WALTER C. STYPULKOWSKI
BY Kane, Dalsimer and Kane
ATTORNEYS Sept. 3, 1963 W. C. STYPULKOWSKI ET AL 3,102,982

AIR RESCUE TRANSMISSION APPARATUS

Filed March 13, 1961 4 Sheets-Sheet 3

INVENTORS
KENNETH C. JACOBS
WALTER C. STYPULKOWSKI
BY
Kane, Dalsimer and Kane

ATTORNEYS

Sept. 3, 1963 W. C. STYPULKOWSKI ET AL 3,102,982

AIR RESCUE TRANSMISSION APPARATUS

Filed March 13, 1961 4 Sheets-Sheet 4

INVENTORS
KENNETH C. JACOBS
WALTER C. STYPULKOWSKI
BY Kane, Dalsimer and Kane
ATTORNEYS

United States Patent Office 3,102,982
Patented Sept. 3, 1963

3,102,982
AIR RESCUE TRANSMISSION APPARATUS

Walter C. Stypulkowski, West Caldwell, and Kenneth C. Jacobs, Old Bridge, N.J., assignors to Aeronad Electronic Corp., West Caldwell, N.J., a corporation of New Jersey Filed Mar. 13, 1961, Ser. No. 95,228
5 Claims. (Cl. 325—112)

This invention relates to a functionally and structurally improved signaling apparatus generating an easily recognizable signal at emergency frequencies.

The present apparatus may be automatically or manually energized.

A further object is that of furnishing an apparatus in which functions necessary to its proper operations will occur automatically upon energization. Thereafter, the desired signal will be transmitted until either the energizing source is exhausted or manually disconnected from the transmitter.

An additional object is that of providing an improved circuit for a transmitter forming a part of the apparatus.

Among other objects are those of providing an assembly of this nature in which a testing provision will exist such that a user may assure himself that the apparatus is in proper operating condition without it being necessary, however, to energize the transmitter. Additionally, the assembly will include relatively few parts, each individually simple and rugged in design; a structure being present which will be virtually indestructible.

With these and other objects in mind reference is had to the attached sheets of drawings illustrating practical embodiments of the invention and in which.

Figures 1, 2, 3:
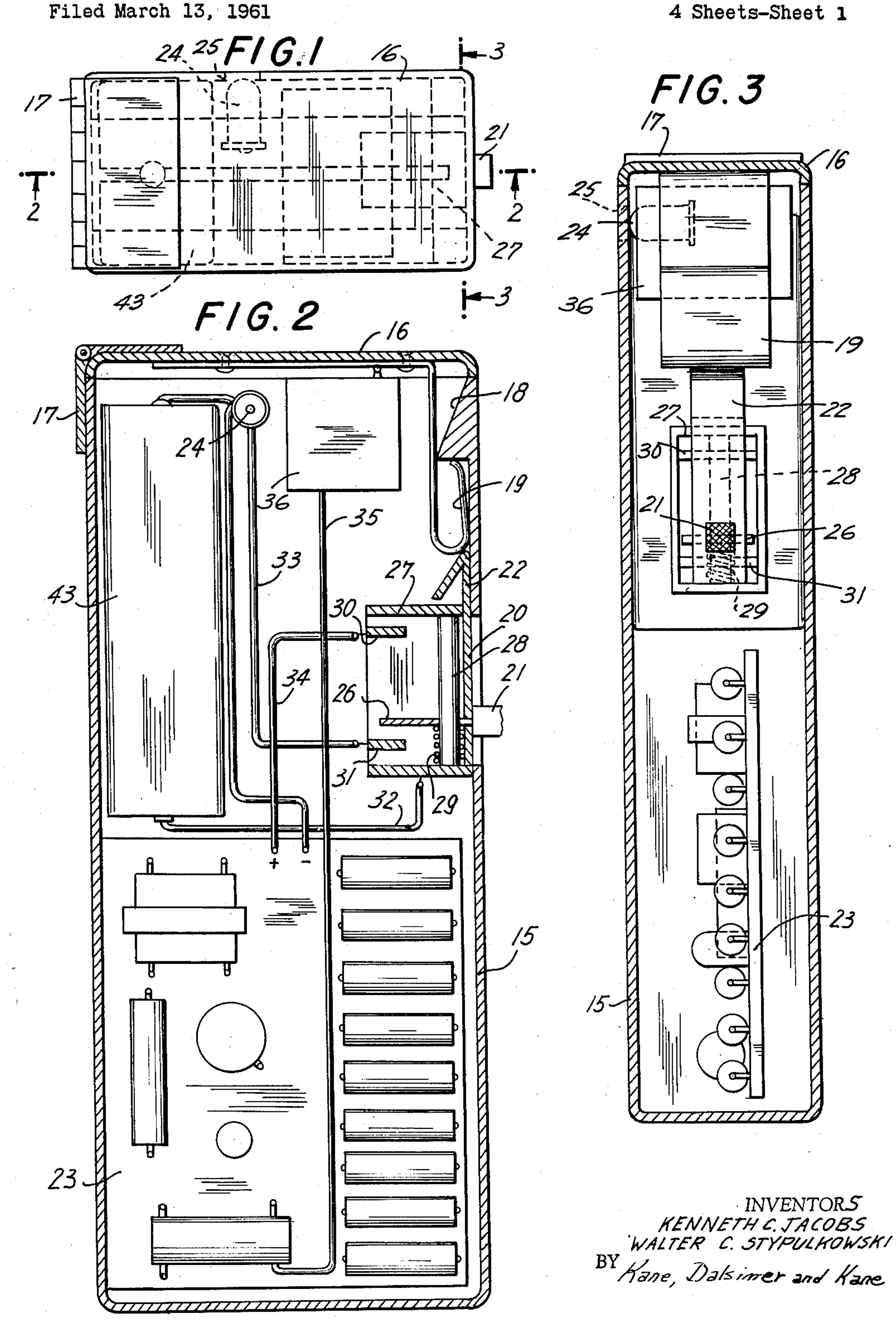
FIG. 1 is a top plan view of the casing or housing structure containing the operating apparatus.
FIG. 2 is a sectional side view taken along the line 2—2 in the direction of the arrows as indicated in FIG. 1.
FIG. 3 is a similar but transverse view taken along the line 3—3 in the direction of the arrows as indicated in FIG. 1.

One form of apparatus is shown especially in FIGS. 1 to 5, inclusive. This will involve a manually operable or excitable assembly. Thus, in these views the numeral 15 indicates a suitable form of casing having an open face normally covered by a lid 16 preferably connected by a hinge 17 with the body of the casing to provide an enclosing structure. A releasable latch structure may normally maintain this cover in closed position and include a detent 18 forming a part of the casing over which the head portion 19 of a spring will ride as the cover is shifted to close; such head occupying a position to the rear of the detent 18. This latch may be released by, for example, employing a slide 20 movably bearing against an inner edge surface of the casing and mounting an actuator 21. The forward or upper portion of this slide is in the form of a releasing wedge element 22 which, when the slide is projected, will underride the head 19 and force it to a position at which it clears the detent or abutment 18. Under these circumstances the lid or cover 16 will be free to swing upwardly.

The transmitter has been generally indicated by the numeral 23. Its circuit will preferably be printed upon a panel. While various types of sensory signals may be provided to indicate to a person testing the apparatus that an adequate supply of electrical energy is present, it is preferred to employ a visual signal by, for example, a bulb 24 mounted within the casing and which may be viewed through a sight aperture, such as 25. To alternately close the circuit through this signaling device or through the transmitter 23, plate 20 may carry a contact in the form of a blade 26 which moves with it as it is shifted. A housing 27 is conveniently disposed adjacent plate 20 and carries a rod 28 extending through an opening in blade 26 for guiding it as well as plate 20. A spring 29 conveniently encircles rod 28 below the blade 26 and urges the latter together with plate and actuator 21 in an upward direction. Wedge 22 being in contact with head portion 19 when the parts are in the positions shown in FIG. 2, the spring will have insufficient power to force plate 20 to assume an extreme upper position. Rather to shift in this manner an operator will have to manually push the actuator 21 to overcome the resistance offered by the resilient head 19. Also, by means of this actuator, blade 26 may be shifted downwardly from the position shown in FIG. 2 and against the resistance offered by the spring.

At the upper and lower limits of travel of the actuator and the parts connected therewith, terminals 30 and 31 are provided. As shown especially in FIG. 5, a lead 32 extends from a source of electrical energy. This lead is connected to the blade or arm 26. When the latter engages contact 31, current will flow through a lead 33 to the lamp 24 and thence through to the electrical energy source. When the arm 26 engages terminal 30, current will flow through lead 34 to the transmitter 23 and thence back to the source. It is apparent that if the sensory signal 24 functions, a user will be aware that the current source is potentialized to supply the necessary energy to the transmitter. Thereafter, if blade 26 is engaged with contact 30, the transmitter will be caused to function. In order to avoid unnecessarily confusing illustration, cushioning material has not been shown in the several views under consideration. Suffice it to say that all fragile parts are housed within a thickness of material such as foam rubber interposed between those parts and the inner surfaces of the enclosing or encasing structure.

Figures 4, 12:
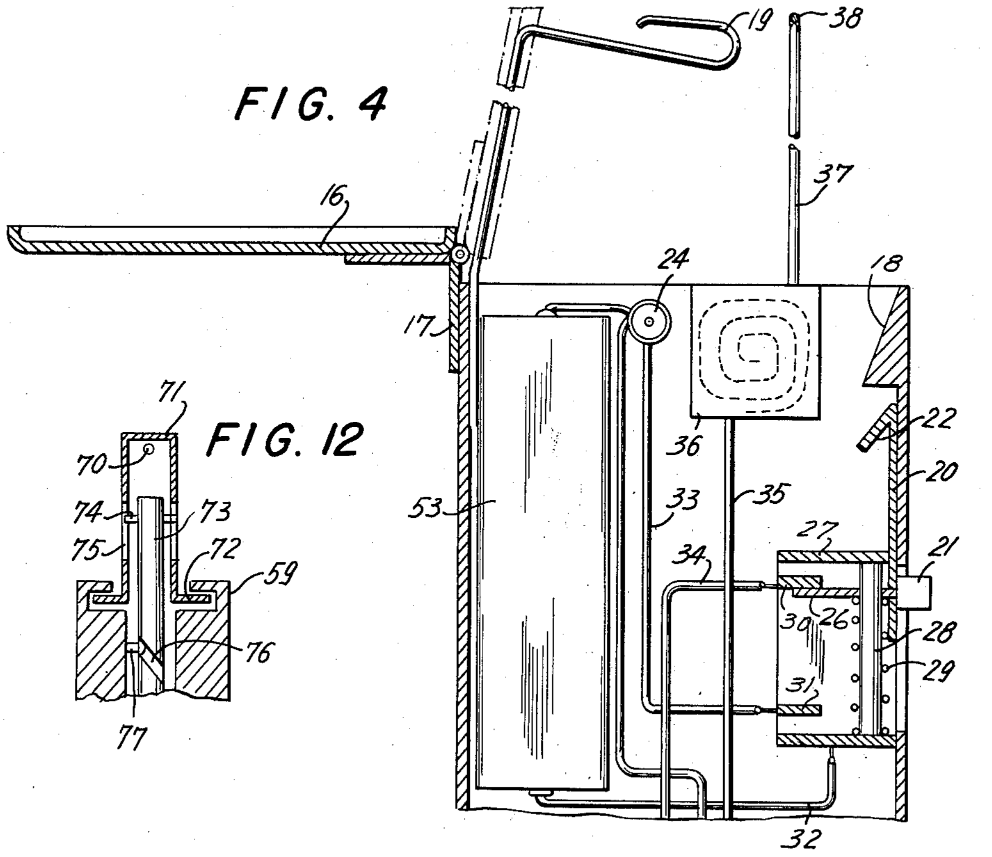
FIG. 4 is a fragmentary sectional side view of the upper parts of the assembly as illustrated in FIG. 2 and showing them occupying different positions from those illustrated in the preceding views.
FIG. 12 is a fragmentary partly sectional view of the solenoid which forms a part of the apparatus of FIG. 6.

The antenna connected to the transmitter by a lead 35 is conveniently housed within a compartment 36. It will include, as indicated in FIG. 4 and shown in FIG. 8, a spring body 37 conveniently in the form of a strip of resilient material initially coiled to be housed within compartment 36 and connected to the antenna lead 35 in any desired manner. The outer end of the antenna may conveniently terminate in a rounded bearing portion 38, which with lid 16 closed will bear against the inner face of the latter, as shown in FIG. 2. The resiliency of the strip or body 37 is such that with the latch released to free the cover from restraint, the antenna will forcibly uncoil thereby throwing back the cover 16 around hinge 17 while at the same erecting or extending its body beyond the casing structure 15. When actuator 21 is shifted upwardly as viewed in FIG. 2 to release the latch-head 19, spring 29 will thereafter maintain arm or blade 26 in engagement with contact 30 until the actuator is again manually shifted.

Figure 5:
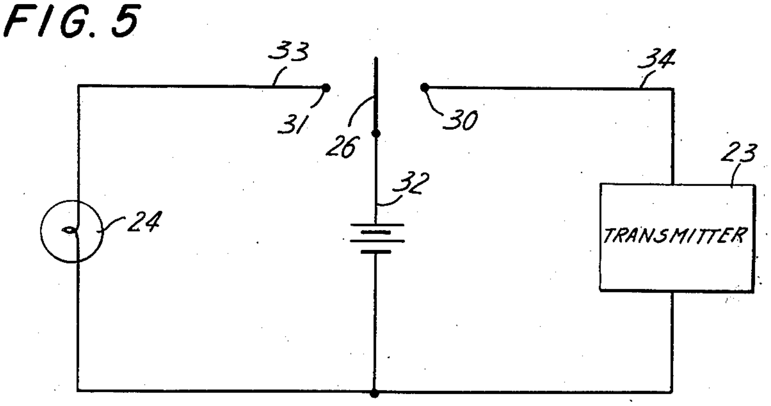
FIG. 5 illustrates a preferred form of circuit for energizing the transmitter or sensory signaling means.

The apparatus of FIGS. 1 to 5, inclusive, embraces a manually controlled assembly. The apparatus illustrated in FIGS. 6, 7 and 9 to 13, inclusive, is designed so that it will function automatically when required. A condition where it becomes self-excited or operational due to external forces is found, for example, where it might be mounted in an aircraft, which had been subjected to a crash landing. Under these conditions the shock or violence of the landing would cause the apparatus to automatically function free from any manual supervision. With a view to avoiding unnecessary complication of the drawings, the later views do not include a test provision, as illustrated in FIG. 5, whereby a user may satisfy himself that the battery is in proper condition. It will be understood, however, that ordinarily a test circuit involving this function and embracing a sensory signaling device may be present. In both the apparatus of FIGS. 1 to 5, inclusive, as well as the later group of figures, it is preferred that in accordance with this invention the transmitter embrace a structure such as has been generally shown in FIG. 14.

In that view it will be apparent that an extremely compact and simple layout is preferably involved. The signal produced is an AM modified radio frequency 121.5 megacycles.

The circuit is composed of two self-excited oscillators. The first represented by transistor 40 is a modified audio oscillator. The second, which is coupled to the first, and which is represented by transistor 41, is an ultradyne type radio frequency oscillator. The latter oscillator is modified by the audio oscillator.

The audio oscillator circuit consists of NPN transistor 40 in a feedback common emitter amplifier configuration. Power is supplied for both oscillators from a battery 43. Transistor 40 is biased through resistance 44, and the output of the oscillator is biased through modulation transformer 45. Capacitor 46 and variable resistance 47 constitute the feedback circuit for the audio oscillator.

The radio frequency oscillator is made up of NPN transistor 41 in a feedback type of common emitter circuit. Resistance 48 provides bias for the base and resistance 49 and capacitor 50 provides bias for the emitter. Feedback occurs through capacitor 51, resistance 52 and the primary of output transformer 53.

The radio frequency produced by the oscillator of transistor 41 is modified by the output of the audio frequency oscillator and coupled to it through radio frequency choke 54. Capacitor 55 filters to ground any radio frequency that feeds back through the choke 54.

The output of the radio frequency stage is coupled to antenna 37 through output transformer 53.

The parameters and the particular transistors of the circuit, of course, may be varied. In the preferred form, transistor 40 will be a 2N706 and transistor 41, a 2N335. Battery 43 will be 22.5 volts, resistance 54, 220,000 ohms. Capacitor 66, 0.1 microfarad. Capacitor 65, 0.001 microfarad. Resistance 58, 50,000 ohms, resistance 49, 1,000 ohms, capacitor 50, 200 micromicrofarads, resistance 62, 100,000 ohms and capacitor 51, 100 micromicrofarads.

Figures 6, 7, 8, 9, 10, 11:
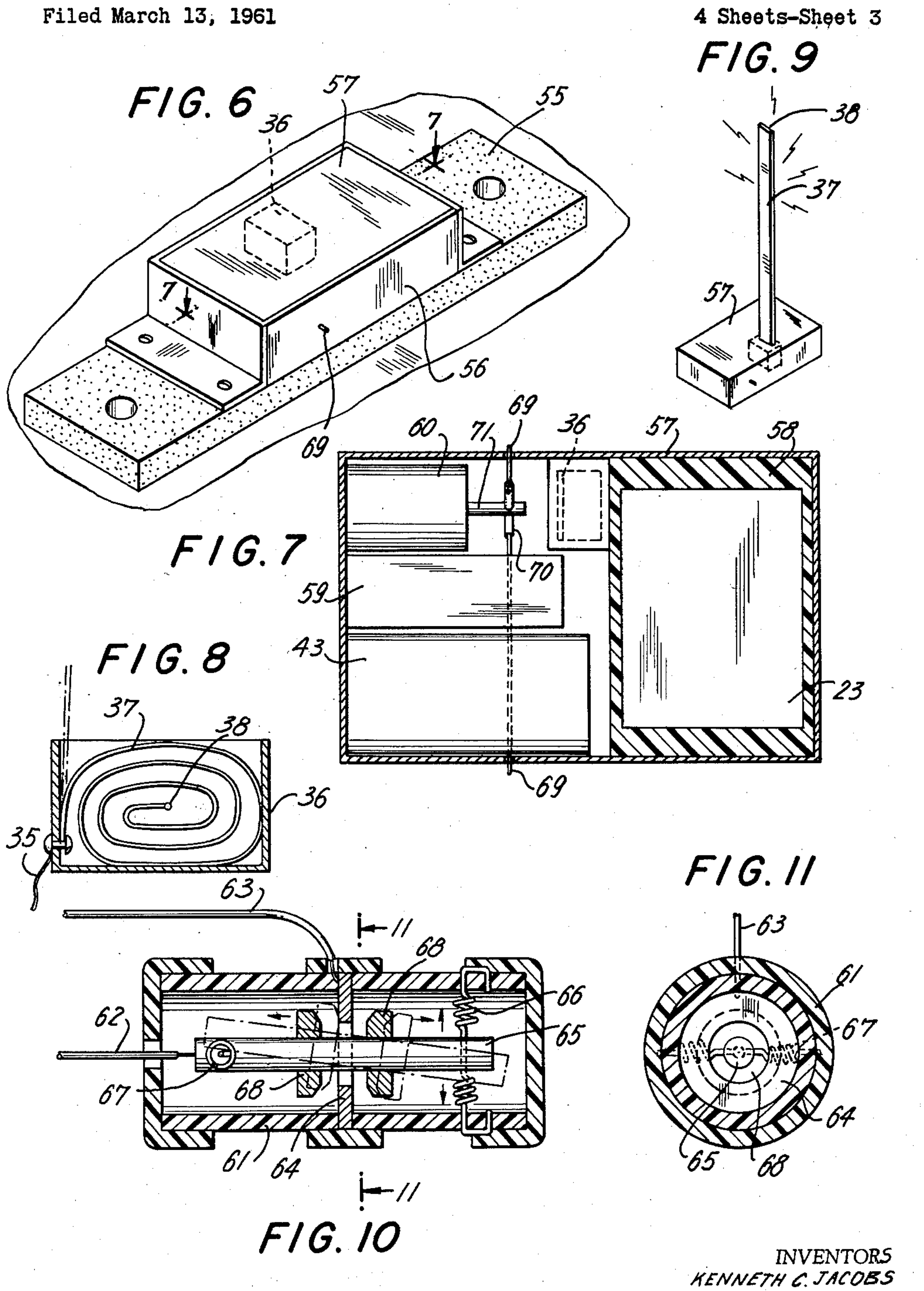
FIG. 6 is a perspective view of an alternative form of assembly.
FIG. 7 is a sectional plan view taken along the line 7—7 in the direction of the arrows as indicated in FIG. 6.
FIG. 8 is a somewhat schematic view of a preferred form of antenna structure.
FIG. 9 is a perspective view illustrating the condition of the apparatus when it has been dismounted from the position shown in FIG. 6.
FIG. 10 is a sectional side view of an automatically operable switch mechanism which forms a part of the structure shown in FIG. 6.
FIG. 11 is a transverse sectional view taken along the line 11—11 in the direction of the arrows as indicated in FIG. 10.

An installation typical of that requiring a self-exciting or operating apparatus is schematically illustrated in FIG. 6 in which the numeral 55 indicates, for example, a structural part affixed to an airplane and embracing a casing 56, the upper face of which is open. Disposed within this casing is the base of an enclosure 57 which forms a part of the apparatus. This base will face upwardly so that the apparatus extends downwardly therefrom with its open face covered by the surface supporting it. As shown particularly in FIG. 7, the apparatus will include the transmitter 23, as afore described which is enclosed within a cushioning and moisture-impervious layer 58. The necessary battery 43 will also be included within the assembly. Additionally, a casing 59 (FIG. 13) housing a switch structure will be present together with a solenoid generally indicated at 60 and an antenna housing or compartment 36, as afore described. Certain or all of these units may also be cushioned within moisture proof and protective layers such as 58; it being understood that the apparatus of FIGS. 1 to 5, inclusive, may be similarly protected.

The switch within casing 59 should close when subjected to shock. A preferred form of switch incorporating such a function is illustrated especially in FIGS. 10 and 11. In those views the numeral 61 indicates a casing assembly preferably formed of dielectric material and into which leads 62 and 63 extend. The latter lead connects with a central apertured partition 64 formed of metal. Extending through the latter is a metallic rod 65 which adjacent one of its ends is suspended between a pair of opposed springs 66. Adjacent its opposite end it is supported by a second pair of opposed springs 67. The latter, however, are arranged to extend substantially at right angles to the direction in which springs 66 extend. Contact members 68 are attached to rod 65 at points adjacent partition 64. The size of the aperture through the latter is such that ample clearance will exist between the rod and its associated parts and the partition. However, should the switch be subjected to shock in any direction, the mass of the rod-member assembly in comparison with the support afforded by springs 66 will cause electrical contact to occur between the unit connected to leads 62 and 63, thereby closing the circuit.

Figure 13:
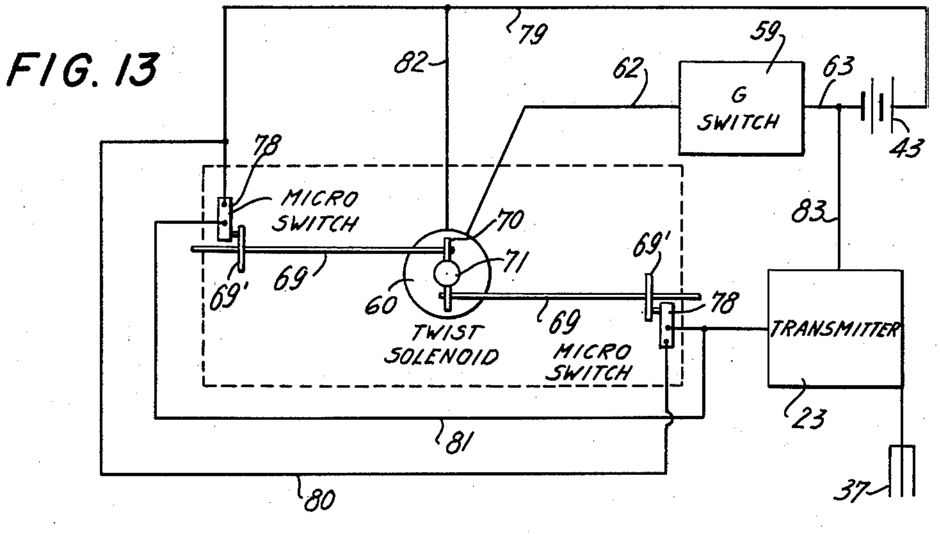
FIG. 13 is a diagrammatic representation of the apparatus-controlling circuit included in the latter form of assembly.
Figure 14:
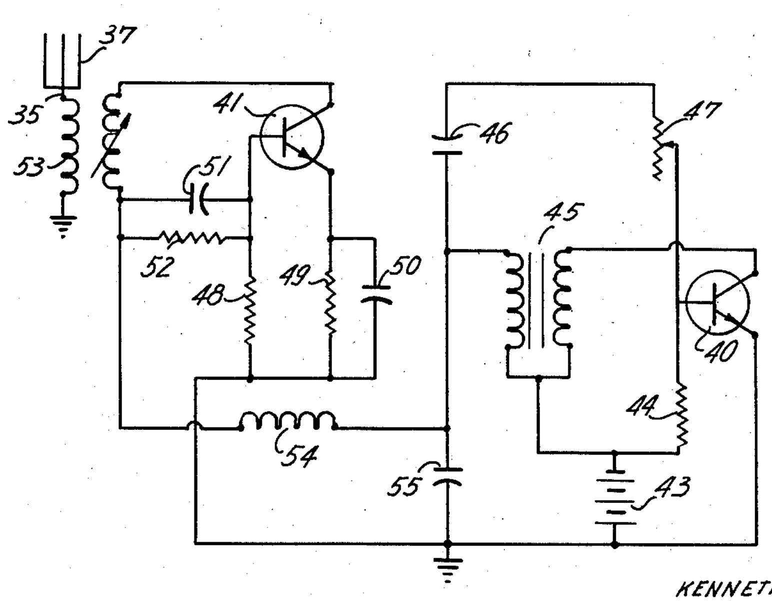
FIG. 14 illustrates a preferred form of transmitter preferably included in the present apparatus.

Returning to a consideration of FIGS. 6 and 7, it will be noted that the side walls of the encasing structures 56 and 57 are provided with openings which, in the initial condition of the parts, are aligned so that rods 69 may extend through the same and beyond the enclosure. The inner ends of these rods, as in FIG. 13, are connected one to each of opposed arms 70 affixed to the operating member 71 of the solenoid 60. The latter is known as a "twist" type. While it may involve one of a number of different designs, a suitable form of structure has been shown in FIG. 12 in which the operating member 71 is illustrated as being in the form of a casing member having at its base an outstanding flange 72 supported for rotation within the upper end of the solenoid assembly 59. A rod 73 providing the upper portion of the armature mounts outwardly extending pins 74. The latter ride within slots 75 formed in the encasing member or stem 71. Rod 73 is formed with a spirally extending groove 76. In accordance with conventional design a spring is furnished to normally maintain the armature in projected position. However, when the solenoid is energized, the armature will be retracted. A pin 77 forms a part of the solenoid assembly and rides within the groove 76. Therefore, under retraction of the armature rod 73 will not alone move inwardly but will also make a partial revolution. Corresponding rotation will be imparted to stem 71 to thereby rock arms 70 and retract the pins or rods 69. So retracted, they will clear the encasing structure 56 to accordingly permit a withdrawal of the enclosed casing 57.

It will be borne in mind that the compartment or housing 36 for the antenna faces downwardly and that the antenna is constructed of a material such that it embodies a relatively powerful spring action. Accordingly, when the latch structure provided by rod 69 is rendered inoperative, the free end of the antenna will bear against an adjacent surface of the support 55 and will cause the entire apparatus to be ejected from the enclosure 56 and simultaneously uncover the casing. It is apparent that if supplementary spring means additional to the antenna 38 should prove to be desirable it may be provided. In any event with such ejection the entire operative assembly will be thrown free of adjacent structures. The center of gravity of the assembly should be quite close to the base portion of the casing 57. Therefore, the apparatus in flight will right itself so that the casing 57 will form the base with the antenna 37 extending upwardly therefrom, as illustrated in FIG. 9. In such position it will, of course, be in proper condition to transmit a signal.

Again, considering FIG. 13, it will be noted that microswitches 78 are disposed adjacent the rods 69 and have their actuators engaged by elements 69' moving with the rod. These switches are conveniently mounted on the inner face of the encasing structure 57. A lead 79 extends from the current source or battery 43 and is connected to the first of these microswitches. An extension 80 of lead 79 connects with the second microswitch. The opposite terminals of the latter switches are connected by a lead 81 to each other and with the transmitter 23. A branch lead 82 may extend from lead 79 to one side of the solenoid 60. The opposite terminal of the latter is connected to lead 62 extending from switch 59. The lead 63 of that switch in addition to being connected to the battery 43 is coupled to a branch lead 83 connecting with transmitter 23.

In operation and considering primarily the apparatus as illustrated in FIGS. 1 to 5, inclusive, it is apparent that a user by projecting actuator 21 may cause the sensory signaling device 24 to operate so as to be assured that the battery is in proper condition. By moving the actuator in an opposite direction the latch structure is released and the parts will shift from the positions shown in FIG. 2 to those illustrated in FIG. 4. Under the latter condition the apparatus will produce a receivable signal transmitted on an emergency frequency such that searchers will have no difficulty in homing on the signal. When it is desired to discontinue the latter, by simply shifting the actuator to the position illustrated in FIG. 2, transmission of the signal will cease.

With respect to the apparatus shown in FIG. 6 et seq., the shock of a crash landing or similar violent impact will cause the apparatus to assume a proper position and to emit the desired signal. This will occur incident to a switch of the type shown in FIGS. 10 and 11 closing the required circuit as a consequence of the mass of the movable switch member when the impact occurs. Thereupon, solenoid 60 will be energized to retract rods 69. The normally open microswitches 78 will close and be locked in. Simultaneously the antenna will be erected, and the desired signal emitted.

From the foregoing it will be understood that among others the several objects of the invention as specifically aforenoted are achieved. Obviously, numerous changes in construction and rearrangement of the parts may be resorted to without departing from the spirit of the invention as defined by the claims.

We claim:

1. A signaling apparatus including in combination a casing having an open face, support means for supporting said casing and providing cover means for normally covering said face, a latch structure coupled with said casing and said cover means for maintaining said casing in a covered condition, a radio transmitter assembly for transmitting radio signals, mounting means for mounting said transmitter assembly within said casing, an expandable spring under compression within said casing at a point adjacent the open end of the latter and electrically coupled with said transmitter assembly, unlatching means for rendering said latch structure inoperative to cause said spring to expand to uncover said casing and exert a force such as to impel said casing away from said support means, said spring having means for permitting it to expand and be erected as an antenna extending beyond said casing at such time as said casing is impelled away from said support means, said unlatching means comprising a current controlled mechanism and a connected single switch assembly, the latter including parts fixed with respect to said casing and movable parts supported in spaced relationship to said first named parts, said parts being adapted to engage with one another, and means for permitting said parts to so engage upon said apparatus being subjected to physical shock in substantially any direction.

2. In an apparatus as defined in claim 1, the transmitter assembly being disposed within said casing in a manner such that the center of gravity of the apparatus is located at a point remote from the open casing face, whereby—after being impelled—said casing will come to rest with its open face extending in an upward direction and with the antenna projecting beyond the same.

3. In an apparatus as defined in claim 1, said movable switch parts comprising a spring-supported rod and contacts carried thereby and a switch part fixed relative to the casing comprising an apertured partition through which said rod extends in spaced relationship to the aperture edge.

4. A signaling apparatus including in combination a casing having an open face, means for normally covering said face, the cover for the open face of said casing comprising a lid connecting to the latter, a radio transmitter assembly within said casing, a source of current forming a part of said assembly, a sensory signaling means within said casing, a latch structure maintaining said casing in a covered condition, said latch structure including a member movably mounted on said casing, an actuator for shifting said member and a latch releasing element also mounted by said member, said member being movable in one direction for rendering said latch inoperative, and switch means connected to said signaling means and current source to engage and energize the former upon said member being moved in a different direction, a spring under compression within said casing at a point adjacent the open face of the latter and connected to said transmitter, and means for rendering said latch structure inoperative whereby said spring will expand to uncover said casing and erect to provide an antenna extending beyond the same.

5. In an apparatus as defined in claim 4, and spring means connected to said member to urge said latter switch parts out of engagement with each other.

References Cited in the file of this patent

UNITED STATES PATENTS

| | | |
|---|---|---|
| 2,315,353 | Shaw | Mar. 30, 1943 |
| 2,361,177 | Chilowsky | Oct. 24, 1944 |
| 2,473,050 | Camp | June 14, 1949 |
| 2,491,629 | Vernier et al. | Dec. 20, 1949 |
| 2,500,809 | Fennessy et al. | Mar. 14, 1950 |
| 2,552,969 | Holman | May 15, 1951 |
| 2,913,073 | Wendling | Nov. 17, 1959 |
| 2,928,935 | Murray | Mar. 15, 1960 |

OTHER REFERENCES

Hellmers: Radio and Television News, page 196, October 1953.